UNITED STATES PATENT OFFICE 2,665,199

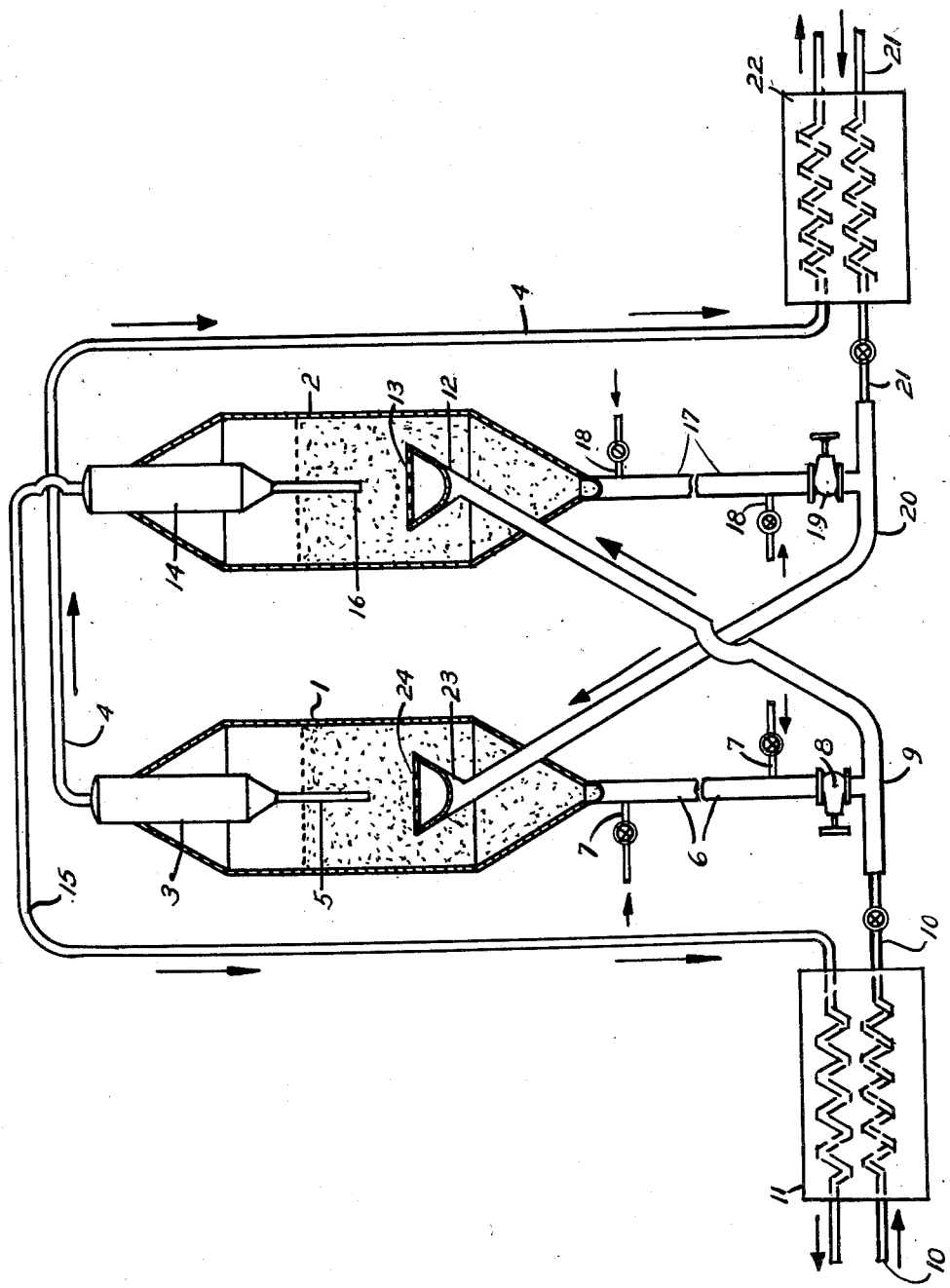

PROCESS FOR PRODUCING HYDROGEN AND CARBON MONOXIDE FROM GASEOUS HYDROCARBONS

Homer Z. Martin, Roselle, and Charles E. Hemminger, Westfield, N. J., assignors to Standard Oil Development Company, a corporation of Delaware Application December 10, 1946, Serial No. 715,258

3 Claims. (Cl. 48—196)

The present invention is directed to a method for producing industrial gas mixtures containing carbon monoxide and hydrogen from gaseous hydrocarbons. More particularly, it embraces a method for producing mixtures of hydrogen and CO containing more than two volumes of hydrogen per volume of CO for use in the synthesis of hydrocarbons and other valuable organic compounds by the Fischer Tropsch Synthesis. This application is a continuation-in-part of U. S. Serial No. 364,974, filed November 9, 1940.

It has already been proposed to produce gas containing carbon monoxide and hydrogen by reacting a gaseous hydrocarbon, such as methane, with the metal oxide capable of giving up oxygen at the reaction temperature. In this process the metal oxide of reduced oxygen content is regenerated by being reacted with an oxidizing gas. The process is ordinarily carried out continuously with a stream of metal oxide of reduced oxygen content running continuously from the reactor to the regenerator and a stream of metal oxide of greater oxygen content continuously running from the regenerator to the reactor. Alternatively, the process may be operated on the blow-and-run principle with hydrocarbon contacting the metal oxide until its oxygen content is reduced and then the hydrocarbon being replaced by an oxidizing gas until the oxygen content of the metal oxide is restored to desired level.

According to the present invention, the process of the aforesaid type is improved by feeding steam to the reactor concurrently with the hydrocarbon. This steam serves to reduce the overall oxygen requirements of the process and makes possible the production of product gases containing more than two volumes of hydrogen per volume of carbon monoxide. The reactions may be represented as follows:

$$CH_4 + \tfrac{1}{2}O_2 = CO + 2H_2 \quad (1)$$
$$CH_4 + H_2O = CO + 3H_2 \quad (2)$$

Actually, the product gas is in equilibrium according to the water-gas reaction where:

$$K = \frac{H_2 \times CO_2}{H_2O \times CO}$$

In other words, some $CO_2$ is present. In the hydrocarbon synthesis reaction this $CO_2$ can be utilized according to the equation $$3H_2 + CO_2 = CH_2 + 2H_2O \quad (3)$$

However, this is possible only if the $H_2/CO$ ratio is greater than 2 whereas to form $CH_2$ from $CO+H$ only a 2 to 1 ratio is required. Ratios greater than 2 are obtainable by Reaction 2 above. In this way, for a given amount of $CH_4$, more equivalent synthesis gas is obtainable with less oxygen by injecting steam into the synthesis gas producer.

In the preferred embodiment of the present invention, the reagents entering the synthesis gas producing unit, including the regenerator, are preheated by heat exchange with the products. These reagents are the hydrocarbon and steam entering the producer and the air entering the regenerator. In the continuous operation referred to above, the methane and steam are preheated by the outlet gas from the reactor and the air to the regenerator is preheated by the outlet gas from the regenerator. When this preheating is performed, more steam can be substituted for oxygen while maintaining the system in heat balance. The optimum steam addition is determined by the operating conditions of the unit and the amount of preheat available to keep the unit in heat balance. In general, the amount of steam fed to the reactor or gas producer may vary between .3 and 10 volumes per volume of hydrocarbon feed.

The following comparison shows the advantages of the use of steam with preheat of the gaseous feeds:

| | | |
|---|---:|---:|
| Temperature, °F | 1,600 | 1,600 |
| Pressure, P. s. i. g | 100 | 100 |
| Heat Loss, B. t. u./lb. Mol $CH_4$ charged | 2,000 | 2,000 |
| Preheat Temperature [1] °F | 1,000 | 0 |
| $H_2O$ used, Mol/Mol $CH_4$ charged | 0.72 | 0 |
| $O_2$ required, Mol/Mol $CH_4$ charged | 0.553 | 0.716 |
| $CH_4$ conversion, percent | 95.0 | 92.8 |
| Synthesis Gas Produced,[2] Mol/Mol $CH_4$ charged | 2.9 | 2.28 |
| Purity of Dry Synthesis Gas,[3] percent | 97.8 | 91.1 |

[1] Preheat temperature of all inlet gases, $CH_4$, air, and steam.

[2] $H_2+CO+CO_2$ where $CO_2 = \dfrac{H_2 - 2CO}{3}$

[3] Content of $H_2+CO+CO_2$ where $CO_2 = \dfrac{H_2 - 2CO}{3}$

It will be noted that in the case where no steam is used the $CH_4$ conversion cannot be raised to 95% in spite of the fact that none of the waste heat is utilized to preheat the reagents. Also, 21% less synthesis gas is produced, and the gas is not nearly as pure.

In operating according to the present invention, any one of a number of metal oxides which are capable of giving up oxygen at the reaction temperature may be employed. The reaction temperature will ordinarily be between about 1500° and 2000° F., depending upon the oxide employed. Among suitable oxides may be mentioned the various iron oxides, copper oxide, titanium oxide, zinc oxide, manganese oxide, and the like. The process may be operated at any desired pressure but is preferably operated at elevated pressures from about 100 to 600 lbs./sq. in. in order to produce a product gas at a suitable pressure for the hydrocarbon synthesis reaction.

While the method of the present invention may be practiced with a fixed bed of contact mass, it is preferred to practice the method by utilizing the fluidized solid technique. In this case, the oxide is used in the form of powder having particles of various sizes, ranging upwardly from about 5 microns in diameter, the major portion of the particles passing through 100 mesh. The powdered solid is maintained in suspension in the reaction gas by suitably adjusting the feed rates of the gas and the powder to the contacting zone. A gas velocity through the contacting zone between about .5 and 5 ft. per second, preferably from 1 to 3 ft./sec., is suitable, and for any given velocity the feed of powdered solid is adjusted so as to maintain in the contacting zone a suspension containing at least about 6% by volume of powdered solid. Preferably the suspension may contain between 10 and 40% by volume of powdered solid.

The nature of the present invention will be more clearly understood from the following detailed description of the accompanying drawing in which the single figure is a front elevation in diagrammatic form of one type of unit suitable for the practice of the present invention.

Referring to the drawing in detail, the unit in general comprises a reactor 1 and a regenerator 2. The upper end of the reactor is provided with a cyclone or other separator 3 out of the top of which gas leaves through line 4 and from the bottom of which solid is returned to the suspension in the reactor through pipe 5. At the bottom of the reactor is a solid draw-off line 6 which is provided with aerating jets 7 and a slide valve or other control member 8 which empties into a conduit 9. Air or other oxidizing gas is fed into the conduit 9 through line 10 after passing through heat exchanger 11.

Conduit 9 terminates in regenerator 2 in a funnel 12 provided with a grid or grate 13. Regenerator 2 also has at its upper end a cyclone or other separator 14 from the upper end of which gas leaves through line 15 and from the bottom of which solids return to the suspension in regenerator 2 through pipe 16. Line 15 passes through heat exchanger 11 where the regenerator off-gas gives up heat to the regenerator feed gas. At the bottom of regenerator 2 is a solids draw-off line 17 provided with aerating jets 18 and a slide valve or other control element 19 and discharging into a conduit 20. Into one end of conduit 20 is fed hydrocarbon and steam in suitable proportions through line 21 after passing in heat exchange relation with the product gas in line 4 in heat exchanger 22. Conduit 20 terminates in reactor 1 in a funnel 23 provided with a grate or a grid 24.

The reaction conditions maintained in the reactor 1 have heretofore been given. In the case of $Fe_2O_3$ it is desirable to operate the reactor at a temperature between 1600 and 1800° F. at a pressure between 100 and 600 lbs./sq. in. and with a throughput of gas which may vary between 20 v./v./hr. and 600 v./v./hr. but which will ordinarily be between 100 v./v./hr. and 400 v./v./hr. In this case it is desirable to insure at all times the presence of some free iron in reactor 1. This may be done by controlling the oxidation in regenerator 2 or by maintaining a separate vessel similar to regenerator 2 through which is circulated some of the solid from reactor 1 which is reduced to metallic state in said separate vessel and returned to reactor 1.

The workings of the present invention can be understood from the following tabulation:

| Synthesis Gas Manufacturing Plant: | | | |
|---|---|---|---|
| Charge Gas— | | | |
| $CH_4$ | 1.0 | 1.0 | 1.0 |
| $H_2O$ | | | 0.73 |
| $O_2$ | 0.5 | 0.65 | 0.55 |
| Synthesis Gas Produced: | | | |
| $H_2$ | 1.47 | 1.521 | 1.957 |
| CO | 0.746 | 0.781 | 0.738 |
| $CO_2$ | 0.057 | 0.1228 | 0.212 |
| $CH_4$ | 0.197 | 0.098 | 0.050 |
| Synthesis Plant: Product | 0.68 | 0.707 | 0.809 |

In the first two columns the $H_2/CO$ ratio is a little less than two whereas in the last column the ratio is about 2.6. In all three cases the temperature and pressure of synthesis gas production are 1600° F. and 100 p. s. i. g. The figures shown in the column are the number of mols of the various components indicated, based on one mol of methane charged to the synthesis gas production. It will be observed that the greater $H_2/CO$ ratio in the third column and the added $CO_2$ content of the synthesis gas in this case are obtained by the addition of steam to the synthesis gas producer. The addition of the steam is beneficial in increasing the degree of conversion of methane. Thus, even though in the second case 0.65 mol of oxygen is charged per mol of methane as compared to 0.55 in the third case, the methane conversion in the second case is only about 90% compared with 95% in the third case. In the next to the bottom line of the tabulation is a figure for the mols of product. This quantity is the mols of $CH_yO_z$ where $y$ in this case was taken to be 2.3 and $z$ was taken to be 0.026. In other words, this figure shows merely the relative amounts of paraffins plus oxygenated compounds formed. It will be observed that the operation of the third column is superior to either of the first two. Column 3 shows a yield of products per mol of methane charged about 19% greater than shown in column 1 and about 14% greater than in column 2. In the cases of columns 1 and 3, assuming that the metal oxide technique is to be used, the feed gases would have to be preheated to about 800–1000° F. In the case of column 2, the preheat is much lower, being in the range of about 200° F. Although column 2 shows slightly greater yields than column 1, it may not be very practical since much of the heat in the synthesis gas would merely have to be thrown away to cooling water. This is because in the general case there is no use for the steam which could be produced from these flue gases in the metal oxide scheme. It will be noted that in the case of column 2, very high oxygen (from the air) consumption is required relative to the other two cases.

It will be apparent that many changes may be made in the specific embodiment illustrated without departing from the scope of the present invention. For example, while the contacting zones as illustrated operate on the downflow principle, they may, if desired, operate on the upflow principle utilizing exterior separators for the solids and gas. The solids may be introduced into the contacting zones at points other than those shown and by the use of different expedients. In like manner, the solids may be withdrawn from the contacting zones from points other than those indicated and by other means. The gases introduced into the reactor may be introduced in admixture or separately. The hydrocarbon may be fed into the lower part of the reactor and the steam fed in at a plurality of points spaced from each other vertically in the reactor. Again, the steam may be fed into the reactor at a point below the point of introduction of the hydrocarbon. The heat balance may be achieved by transferring heat from the product gas to the regenerator feed gas and from the regenerator off-gas to the reactor feed gas instead of as shown.

The nature and objects of the present invention having thus been set forth and a specific illustrative embodiment of the same given, what is claimed and desired to be secured by Letters Patent is:

1. A method for producing an industrial gas containing carbon monoxide and hydrogen from a gaseous hydrocarbon which comprises establishing a closed cycle, circulating through said cycle a finely divided solid containing a metal oxide capable of yielding oxygen in the presence of said hydrocarbon, establishing in said cycle a pair of separate beds of said finely divided solid, passing upwardly through one of said beds a preheated mixture of a gaseous hydrocarbon and steam at a velocity sufficient to maintain the finely divided solid in said bed in a fluidized condition while maintaining in said bed a temperature at which said hydrocarbon reacts with said metal oxide, recovering a product gas from the upper part of said bed, passing said product gas in heat exchange relation to the gaseous feed to said bed, passing upwardly through the other of said beds an oxidizing gas at a velocity sufficient to maintain the finely divided solid in said bed in a fluidized condition while maintaining in said bed a temperature at which said metal is oxidized, recovering a hot residue gas from the upper portion of said bed and passing said hot residue gas in heat exchange relation to the oxidizing gas fed to said bed.

2. A method according to claim 1 in which the gaseous mixture passed upwardly through said first bed includes between .3 and 10 volumes of steam per volume of hydrocarbon.

3. A method according to claim 1 in which the metal oxide is iron oxide.

HOMER Z. MARTIN.
CHARLES E. HEMMINGER.

References Cited in the file of this patent

UNITED STATES PATENTS

| Number | Name | Date |
|---|---|---|
| 1,899,184 | De Simo | Feb. 28, 1933 |
| 1,915,362 | Hanks et al. | June 27, 1933 |
| 2,421,677 | Belchetz | June 3, 1947 |
| 2,425,754 | Murphree et al. | Aug. 19, 1947 |

FOREIGN PATENTS

| Number | Country | Date |
|---|---|---|
| 8,239 of 1899 | Great Britain | Mar. 10, 1900 |
| 23,045 of 1910 | Great Britain | Aug. 24, 1911 |
| 314,870 | Great Britain | Jan. 1, 1931 |